UNITED STATES PATENT OFFICE.

WILLIAM HENRY DUFREE, OF ELGIN, ILLINOIS.

COMPOSITION OF MATTER FOR BUILDING-BRICK.

SPECIFICATION forming part of Letters Patent No. 597,078, dated January 11, 1898.

Application filed June 23, 1897. Serial No. 641,891. (No specimens.)

*To all whom it may concern:*

Be it known that I, WILLIAM HENRY DUFREE, a citizen of the United States, residing at Elgin, in the county of Kane and State of Illinois, have invented a new and useful Composition of Matter to be Used for the Manufacture of Building-Brick, of which the following is a specification.

My composition consists of the following ingredients, combined in the following proportions stated, viz: water, (for one thousand brick,) about fifty gallons; sand, forty-one cubic feet; cement, (Portland,) one and one-fourth barrels; oil of vitriol, one pint; ammonia-water, two quarts; pulverized alum, one and one-half pounds. These ingredients are to be made into a stiff mortar and placed in molds to harden. The sand and cement are to be mixed thoroughly, (dry,) then wet with the solution consisting of ammonia-water, two quarts; pulverized alum, one and one-half pounds; water, fifty gallons, and mixed into a stiff mortar, after which the oil of vitriol, diluted in eight gallons of water, is added.

What I claim, and desire to secure by Letters Patent of the United States, is—

The herein-described composition of matter consisting: of water, (for one thousand brick,) fifty gallons; sand, forty-one cubic feet; cement, (Portland,) one and one-fourth barrels; oil of vitriol, one pint; ammonia-water, two quarts; pulverized alum, one and one-half pounds, substantially as described and for the purpose specified.

WILLIAM X HENRY DUFREE.
his mark

Witnesses:
 JOHN R. POWERS,
 CHAS. H. PEYLER,
 WILLIAM W. BALDWIN.